United States Patent Office 3,308,746
Patented Mar. 14, 1967

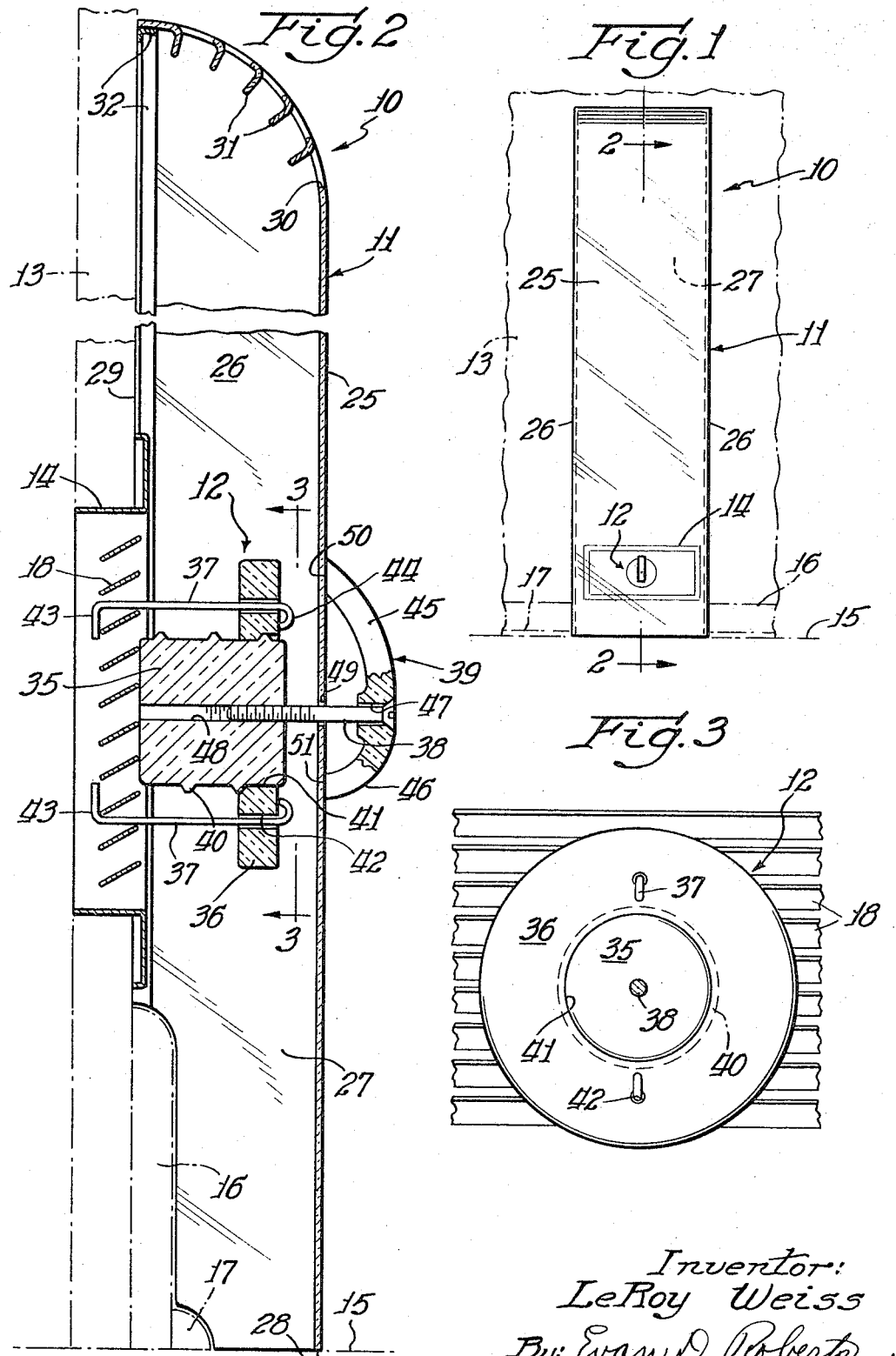

3,308,746
ADAPTOR FOR HOT AIR HEATING SYSTEMS
Le Roy Weiss, Homewood, Ill.
(1812 Tragone Drive, Bridgeville, Pa. 15017)
Filed Dec. 29, 1964, Ser. No. 421,963
6 Claims. (Cl. 98—108)

This invention relates to an adaptor for hot air heating systems and in particular, to an adaptor for use with low level hot air outlets of existing hot air systems to convert such a system to an efficient high level air conditioning system.

Inasmuch as the hot air exhausted from supply registers of a hot air heating system tends to rise and thereby provide spontaneous convection in the space receiving the air, hot air heating systems usually have the hot air registers thereof located low in the space and generally adjacent the floor. Heat supply systems having high level outlets have a tendency to have uncomfortable temperature gradients between the floor level and the upper levels of the space because the hot air supplied thereby naturally tends to stay near the ceiling.

Athough low level supply registers are most desirable for hot air heating systems, these registers are not appropriately adapted for efficient cold air supply distribution such as air conditioning. One reason for this is that cold air tends to descend rather than rise like hot air. Consequently, if an attempt is made to use an existing hot air system for air conditioning, the cold air tends to stay on the lowest level adjacent the floor without appropriate spontaneous convection. As a result, there would be a large uncomfortable temperature gradient between the floor level and the upper levels of the room. Further, there is no heretofore known way of adapting existing low level hot air registers for efficient high level air conditioning without drastic permanent structural alteration of the system, and the building structures in which it is contained.

Therefore, when it is desirable to utilize an existing hot air system, having low level registers, for an air conditioning system, there is a problem of two undesirable choices. First, the utilization of the existing hot air system without alteration, with the resulting uncomfortable and inefficient high temperature gradient results or, secondly, the pursuance of the costly and otherwise burdensome procedure of permanently extending the existing duct work, and installing high level supply registers in addition to the existing low level supply registers. The burden of the second choice is compounded by the fact that the return air registers of either a hot or cold air system are likewise positioned at the opposite level from that of the supply registers, and should also be provided with additional registers for the most efficient results.

It would therefore be highly desirable to provide a structure that would be relatively simple, economical, and which could be readily and selectively utilized with existing hot air duct systems to convert these systems to efficient air conditioning systems without requiring extensive permanent alteration of the existing system, the building containing the system, and the decor of the space to be conditioned.

It is therefore a general primary object of this invention to provide an adaptor for air systems for conditioning a given space to selectively change the level of individual registers of the system in accordance with the temperature and weight of the air to provide the most effective application of the air into the space to be conditioned.

It is therefore a primary object of this invention to provide an adaptor for a hot air heating system having low level exhaust registers to individually convert the registers of the system to high level exhaust registers.

It is another object of this invention to provide an adaptor for hot air heating systems which is provided with a special novel clamp assembly for detachably securing a register of the system.

It is another object of this invention to provide an adaptor for hot air heating systems which may utilize an existing wall as one side of the passage of the adaptor, and which is provided with a means for substantially preventing loss of air between the wall and the adaptor.

It is another object of this invention to provide an adaptor for hot air heating systems which have a structure that can be modified to complement the shape of the wall, floor, trim and molding generally adjacent the register.

It is another object of this invention to provide an adaptor for hot air heating systems which is transparent.

With these and other objects in view, the present invention contemplates an adaptor for hot air heating systems having one or more low level exhaust registers which includes, among other things, an adaptor body that is detachably securable to the register and which will transmit air received from the low level register to a substantially higher level.

Referring to the drawings, the adaptor is generally designated by the numeral 10 and includes generally an adaptor body 11 and a clamp assembly 12. The adaptor 10 is shown in the detachably secured position with respect to a typical wall having a wall board 13, a register 14 positioned in the wall board 13, and a floor 15 with a base board 16 and trim molding 17. The register 14 is provided with vertically spaced horizontal louvers 18.

The adaptor body 11 is made of sheet-like material such as plastic, fiber board or metal and has a front panel 25 and two side panels 26 forming a channel 27 therein. The body 11 rests on the floor 15 on a lower edge 28 thereof, and generally against the wall 13 with vertical edges 29 of the side panels 26 adjacent the wall 13. An exhaust opening 30 is provided in the top of the body 11 and louvers 31 are provided between the sides 26 within the opening 30, which deflect air exhausted through the opening 30 at various angles to disperse the exhausted air.

A thin flat pliable gasket 32, such as plastic or rubber, is secured to the side 26 and upper end of the body. The gasket 32 normally extends beyond the body 11 away from the front 25 so that when the body is positioned immediately adjacent the wall 13 the gasket 32 will deform to snugly complement the shape of the wall and thereby substantially prevent escape of air between the edges of the body 11 and the wall 13. The body 11 is made out of solid sheet material and preferably clear plastic so that the decor of the wall 13 can be seen therethrough and thereby reducing the disturbance thereof by the presence of the adaptor 10.

The clamp assembly 12 includes a center post 35, a disc 36, rods or wires 37, a bolt 38 and a clamp 39. The post 35 has high pitch threads 40 formed thereon and the disc 36 has a threaded aperture 41 that is adapted to be received on the threads 40 of the post 35. The rods 37 are loosely positioned in apertures 42 in the disc so that there can be angular movement of the rods in the apertures. The rods 37 have lateral projections 43 at one end thereof and projections 44 at the other.

The clamp 39 has a long support leg 45, a short support leg 46 and a hole 47 therethrough. The bolt 38 is slidably positioned in the hole 47 and is threaded into an aperture 48 in the post 35. The long leg 45 has a surface 50 and the short leg 46 has a surface 51 for engaging the body 11.

To initiate the installation of the adaptor 10, the disc 36 is held in front of the louvers 18 of the register 14 in approximately the position shown (FIG. 2). The ends 44 of the rods 37 are individually grasped and the rods 37 are manually manipulated to position two or more of the rods into engagement with the louvers 18 (FIG. 2) with the projections 43 behind the louvers 18. The freedom of movement of the rods 37 in the holes 42 allows the rods to be positioned.

The post 35 is then threaded into the disc 36 and eventually into engagement with the louvers 18. The fast high pitch threads 40 of the post 35 and those of the threaded aperture 41 of the disc facilitate reasonably rapid movement of the post 35 into engagement with the louvers 18 as the post 35 is appropriately rotated. When the post is thus forced into engagement with the louvers 18, the disc 36, rods 37 and post 35 will become solidly attached to the register 14. The elements 35, 36 and 37 are equally detachable by merely reversing the process of attachment set forth above.

After the post 35, disc 36 and rods 37 are detachably positioned, the body 11 is approximately positioned as shown (FIG. 2). The bolt 38 is inserted through the hole 47 in the clamp 39. The bolt 38 is thereafter inserted through a hole 49 in the front 25 of the body 11 and threadably inserted in the aperture 48 of the post.

The bolt 38 is tightened in the post 35 and the surfaces 50 and 51 of the long and short support legs 45 and 46 respectively, will be caused to engage the front 25 of the body 11, and will thereby draw the body 11 toward engagement with the wall 13. The gasket material 32 can be depressed inwardly along the length thereof during tightening of the bolt 38. As the bolt 38 is finally tightened the gasket material 32 will take a flattened position against the wall 13 (FIG. 2). Inasmuch as the body 11 is preferably made of clear plastic, or other sheet material, and inasmuch as the body structure 11 is clear of collateral structures at the bottom thereof, the body can be readily cut to complementally fit the trim 16, molding 17 or other adjacent structures of whatever installation it is used with.

It is to be noted that the clamp element 39 is provided with one leg 45 which is longer and this leg is positioned upwardly so that the longer upper portion of the body 11 will be given additional upward support (FIG. 2) toward the extended top thereof.

The most desirable vertical link for the body 11 is approximately seven feet, so that air received from the hot register will be transmitted upwardly, generally adjacent the ceiling of the space to be heated, which in the case of the homes now being built, are usually eight feet. However, this invention is not limited to this dimension, and this dimension is given only for the purpose of indicating that the hot air received by the adaptor 10 can ge raised to an exaggerated level adjacent the ceiling of whatever space is to be conditioned to appropriately disperse the cold air at a substantially high level. Further, it is to be noted that the adaptor 10 by virtue of the clamping assembly 12 thereof is readily attachable and detachable for summer and winter use respectively.

Further, it should be noted that the adaptor can be comparably utilized on a low level cold air or return register to raise the point at which air is taken from the space to be conditioned. This is particularly important when a cooling system is in use, to remove the hotter air from the upper level of the space undergoing conditioning.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. An adaptor for hot air heating systems of the type having exhaust registers vertically positioned in the lower region of the wall generally adjacent the floor and away from the ceiling of the space heated by the system, said adaptor comprising a clear plastic body having three sides defining a longitudinal open channel passage substantially through the length thereof, and means for detachably securing said body to said register with one end and the longitudinal edges of the body in general complemental engagement with the floor and the wall respectively to provide an enclosed passage extended upwardly from the register to the other end of said body, pliable gasket means secured about the periphery of said adaptor for preventing leakage therefrom, said body having an exhaust opening at the termination of the other end thereof generally adjacent the ceiling of the space to exhaust the air from the adaptor into the space adjacent the ceiling.

2. An adaptor for hot air heating systems of the type having exhaust registers vertically positioned in the lower region of the wall generally adjacent the floor and away from the ceiling of the space heated by the system comprising an adaptor body having three sides defining a longitudinal open channel passage through the length thereof; said body having a securing aperture formed therein; and clamp means for detachably securing said body to said register with one end and the longitudinal edges of the body in general complemental engagement with the floor and the wall respectively to provide an enclosed passage extended upwardly from the register to the other end of said body; said clamp assembly having a cylindrical post element having a threaded exterior and an axial threaded aperture, a disc having a threaded aperture for receiving said post to axially and threadably mount said disc on said post element, one or more rods loosely positioned in the apertures of the disc element and adapted to be inserted between the louvers of the register and engageable with the back of the louvers and the outer face of the disc to limit the movement of the disc away from the register, whereby said post may be threadably rotated within said disc into engagement with the outer extremity of the register louvers to secure said disc and said rods and post to the register, a clamp securing element having radially extending portions adapted to engage the outer surface of the adaptor, a bolt threadably secured in the aperture of said post and said adaptor and clamp apertures to secure said clamp to said post and to urge said clamp element into engagement with the adaptor body to detachably secured said body in position.

3. An adaptor for hot air heating systems of the type having exhaust registers vertically positioned in the lower region of the wall generally adjacent the floor and away from the ceiling of the space heated by the system comprising an adaptor body having three sides defining a longitudinal open channel passage substantially through the length thereof; said body having a securing aperture formed therein; and clamp means for detachably securing said body to said register with one end and the longitudinal edges of the body in general complemental engagement with the floor and the wall respectively to provide an enclosed passage extended upwardly from the register to the other end of said body; said clamp assembly having a cylindrical post element having a threaded exterior and an axial threaded aperture, a disc having a threaded aperture for receiving said post to axially and threadably mount said disc on said post element, one or more rods loosely positioned in the apertures of the disc element and adapted to be inserted between the louvers of the register and engageable with the back of the louvers and the outer face of the disc to limit the movement of the disc away from the register, whereby said post may be threadably rotated within said disc into engagement with the outer extremity of the register louvers to secure said disc and said rods and post to the register, a clamp securing element having radially extending portions adapted to engage the outer surface of the adaptor, and a bolt threadably secured in the aperture of said post and said adaptor and clamp apertures to secure said clamp to said post and to urge said clamp element into engagement with the adaptor body to detachably secure said body in position, said body having an exhaust opening at the termination of the other end thereof generally adjacent the ceiling of the space to exhaust the air from the adaptor into the space.

4. An adaptor for hot air heating systems of the type having exhaust registers vertically positioned in the lower region of the wall generally adjacent the floor and away from the ceiling of the space heated by the system comprising an adaptor body having three sides defining a longitudinal open channel passage through the length thereof; said body having a securing aperture formed therein; and clamp means for detachably securing said body to said register with one end and the longitudinal edges of the body in general complemental engagement with the floor and the wall respectively to provide an enclosed passage extended upwardly from the register to the other end of said body; said clamp assembly having a cylindrical post element having a threaded exterior and an axial threaded aperture, a disc having a threaded aperture for receiving said post to axially and threadably mount said disc on said post element, one or more rods loosely positioned in the apertures of the disc element and adapted to be inserted between the louvers of the register and engageable with the back of the louvers and the outer face of the disc to limit the movement of the disc away from the register, whereby said post may be threadably rotated within said disc into engagement with the outer extremity of the register louvers to secure said disc and said rods and post to the register, a clamp securing element having two radially extending portions for engaging the outer surface of the adaptor to support the adaptor in position, one of said extending portions being substantially longer than the other to provide extended radial support for the adaptor in one direction, a clamp securing element having radially extending portions adapted to engage the outer surface of the adaptor, and a bolt threadably secured in the aperture of said post and said adaptor and clamp apertures to secure said clamp to said post and to urge said clamp element into engagement with the adaptor body to detachably secure said body in position.

5. An adaptor for hot air heating systems of the type having exhaust registers vertically positioned in the lower region of the wall generally adjacent the floor and away from the ceiling of the space heated by the system comprising an adaptor body having three sides defining a longitudinal open channel passage substantially through the length thereof; said body having a securing aperture formed therein; and clamp means for detachably securing said body to said register with one end and the longitudinal edges of the body in general complemental engagement with the floor and the wall respectively to provide an enclosed passage extended upwardly from the register to the other end of said body; said clamp assembly having a cylindrical post element having a threaded exterior and an axial threaded aperture, a disc having a threaded aperture for receiving said post to axially and threadably mount said disc on said post element, one or more rods loosely positioned in the apertures of the disc element and adapted to be inserted between the louvers of the register and engageable with the back of the louvers and the outer face of the disc to limit the movement of the disc away from the register, whereby said post may be threadably rotated within said disc into engagement with the outer extremity of the register louvers to secure said disc and said rods and post to the register, a clamp securing element having radially extending portions adapted to engage the outer surface of the adaptor, and a bolt threadably secured in the aperture of said post and said adaptor and clamp apertures to secure said clamp to said post and to urge said clamp element into engagement with the adaptor body to detachably secure said body in position, said body having an exhaust opening at the termination of the other end thereof generally adjacent the ceiling of the space to exhaust the air from the adaptor into the space, and louvers secured to said body and extending into the exhaust opening for diffusing air exhausted from the exhaust opening.

6. An adaptor for hot air heating systems of the type having exhaust registers vertically positioned in the lower region of the wall generally adjacent the floor and away from the ceiling of the space heated by the system comprising an adaptor body having three sides defining a longitudinal open channel passage substantially through the length thereof; said body having a securing aperture formed therein; and clamp means for detachably securing said body to said register with one end and the longitudinal edges of the body in general complemental engagement with the floor and the wall respectively to provide an enclosed passage extended upwardly from the register to the other end of said body; said clamp assembly having a cylindrical post element having a threaded exterior and an axial threaded aperture, a disc having a threaded aperture for receiving said post to axially and threadably mount said disc on said post element, one or more rods loosely positioned in the apertures of the disc element and adapted to be inserted between the louvers of the register and engageable with the back of the louvers and the outer face of the disc to limit the movement of the disc away from the register, whereby said post may be threadably rotated within said disc into engagement with the outer extremity of the register louvers to secure said disc and said rods and post to the register, a clamp securing element having two radially extending portions for engaging the outer surface of the adaptor to support the adaptor in position, one of said extending portions being substantially longer than the other to provide extended radial support for the adaptor in one direction, a clamp securing element having radially extending portions adapted to engage the outer surface of the adaptor, a bolt threadably secured in the aperture of said post and said adaptor and clamp apertures to secure said clamp to said post and to urge said clamp element into engagement with the adaptor body to detachably secure said body in position, and louvers secured to said body and extending into the exhaust opening for diffusing air exhausted from the exhaust opening.

References Cited by the Examiner

UNITED STATES PATENTS

| | | | |
|---|---|---|---|
| 1,638,605 | 8/1927 | Thorson et al. | 98—105 X |
| 2,284,161 | 5/1942 | McElgin | 98—38 |
| 2,679,202 | 5/1954 | Koff | 98—108 X |
| 2,960,021 | 11/1960 | Cotts | 98—103 |
| 2,960,924 | 11/1960 | Grott | 98—94 |
| 3,130,659 | 4/1964 | Compton et al. | 98—37 X |

ROBERT A. O'LEARY, *Primary Examiner.*

M. A. ANTONAKAS, *Assistant Examiner.*